United States Patent

Dickie

[11] Patent Number: 5,995,115
[45] Date of Patent: *Nov. 30, 1999

[54] COMPUTER SYSTEM PROCESS AND USER INTERFACE FOR PROVIDING INTELLIGENT SCISSORS FOR IMAGE COMPOSITION

[75] Inventor: Garth A. Dickie, Madison, Wis.

[73] Assignee: Avid Technology, Inc., Tewksbury, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/835,097

[22] Filed: Apr. 4, 1997

[51] Int. Cl.$^6$ ..................................................... G06T 11/00
[52] U.S. Cl. ........................................... 345/441; 382/316
[58] Field of Search ............................ 345/441; 382/199, 382/316

[56] References Cited

U.S. PATENT DOCUMENTS

| | | | |
|---|---|---|---|
| 5,537,490 | 7/1996 | Yukawa | 382/316 |
| 5,579,405 | 11/1996 | Ishida et al. | 382/199 |
| 5,666,440 | 9/1997 | Hozumi | 382/316 |
| 5,703,963 | 12/1997 | Kojima et al. | 382/199 |

FOREIGN PATENT DOCUMENTS 0 633 548 A2   11/1995   European Pat. Off. .

OTHER PUBLICATIONS

"Intelligent Scissors for Image Composition", by Eric N. Mortensen and William A. Barrett Computer Graphics Proceedings, Annual Conference Series, 1995, pp. 191–198.

"A Nonlinear Laplace Operator as Edge Detector in Noisy Images", by Lucas J. Van Vliet, Ian T. Young and Guus L. Beckers, Computer Vision, Graphics, and Image Processing 45, pp. 167–195 (1989).

*Primary Examiner*—Mark R. Powell
*Assistant Examiner*—Huedung X. Cao
*Attorney, Agent, or Firm*—Wolf, Greenfield & Sacks, P.C.

[57] ABSTRACT

A video editing system capable of tracing and extracting objects in an image selects edges of the object to be traced based on an edge cost computation and on a rotational amount of the edge. The edge cost calculation method modulates the gradient magnitude of the pixel against the gradient direction of an edge to reduce the ambiguity often encountered during tracing as a result of background noise in the image. A method of editing the trace involves introducing control points between previously generated points in the trace. Because of a consistent edge selection criteria, based on a rotational amount of an edge, the characteristics of the previous edge are preserved, and an iterative editing process is eliminated. By basing the selection criteria on a rotation of the path, a total path rotation may be maintained with minimal extra compute operations.

36 Claims, 7 Drawing Sheets

COMPUTER SYSTEM PROCESS AND USER INTERFACE FOR PROVIDING INTELLIGENT SCISSORS FOR IMAGE COMPOSITION

FIELD OF THE INVENTION

This invention relates in general to the field of computer graphics, and more specifically, a tool for providing digital image segmentation and composition for allowing objects to be extracted quickly and accurately from digital images.

BACKGROUND OF THE INVENTION

Digital image composing and manipulation is used to provide special effects in movies and in a variety of graphics applications. In the movies, image composition and digital manipulation techniques have been used to realistically combine objects or regions from various still frames or photographs into new frames to create a seamless, convincing image or image sequence.

One aspect of digital image composing involves digital segmentation. During segmentation, an object within an image is traced so that it may be extracted from the image. Segmentation was originally performed manually, with a user selecting points along the boundary edges of an image to outline the image. The more points entered, the more accurate the outline. However, the time required to place points at each image was time consuming, often resulting in a rough approximation and consequently providing a poor resultant output image.

Computer-based segmentation tools have been provided to attempt to automate portions of the tracing process. However, the tools frequently offer little advantage over manual tracing. A selection of digital image segmentation tools includes region-based 'magic wands', active contours or snakes, or a graph searching formulation of digital processing to find globally optimal boundaries.

In region based 'magic wands' segmentation, a seed point is selected on the edge of an image by a user. The selected seed point is used to grow a region by adding adjacent neighboring pixels to help define edges to provide a higher granularity edge detection. Region growing does not, however, provide interactive visual feedback. As a result, region boundaries must usually reedited or modified manually.

Active contour or snake segmentation is used to improve a manually entered rough approximation. Once the rough boundary approximation is provided, boundary points are adjusted in parallel with the boundary. An energy function is computed based on a combination of internal forces relating to curve energy and external forces related to image gradient magnitude. Active contouring is used to minimize the energy function to approximate the boundary. Unfortunately, the user does not know what the final boundary is until the energy minimization step is completed. If the resulting boundary is not satisfactory, the boundary must be manually edited, and the process must be repeated until a satisfactory boundary is selected. Thus the active contour or snake method is an iterative process that still requires frequent manual intervention.

In graph searching dynamic programming, a manually entered boundary template is provided, and remaining boundary points are computer generated in a stage-wise optimal cost function. Thus, in contrast to the snake, active contour method, there is no iterative energy approximation performed. However, because there is no manual intervention besides the initial supply of the boundary template, the benefits of human guidance and expertise are lost.

An intelligent scissors computer tool described in *Intelligent Scissors for Image Composition,* Computer Graphics Proceedings, Annual Conference Series, 1995, has been provided for balancing the benefits of manual intervention with the advantages provided by computer generated boundary points. An example of tracing using the intelligent scissors tracing tool is illustrated in FIG. 1 with image 10. During intelligent scissors segmentation, a seed point 14 is placed on a boundary edge of a selected object 12 in the image, and a path data structure is generated from the seed point. When a gestured mouse position places a point such as point 16 close to the edge of an object, a live-wire boundary snaps to the boundary of object 12 by snapping to the lowest cost nearby pixel. Thus a line, also referred to as a 'live wire' 18 is generated and wraps the object 12 by following paths in the path data structure back to the seed point 14. Thus, boundary edges are mathematically determined using dynamic programming based on minimal energy comparison techniques.

A problem arises in intelligent scissors segmentation when a pixel at a boundary of a desired object has a higher gradient magnitude than a pixel at a boundary of a nearby object. In the intelligent scissors approach, a gradient magnitude of each pixel is initially determined. The gradient magnitude is a measure of change of color of that pixel from a neighboring pixel. Thus, it can be inferred that a higher gradient magnitude indicates an edge. Higher gradient magnitude pixels are assigned lower costs. If two objects are adjacent in an image, such as object 12 and object 20 in image 10, a boundary pixel of object 20 will have a lower cost than a boundary pixel of object 12. Thus, if a pixel is selected on the boundary of object 12, the lower cost of a pixel on the boundary of object 20 may result in the pixel being snapped to a boundary edge of object 20. Thus, a live wire segment such as segment 22 will be erroneously provided.

To correct the problem of incorrect boundary snapping the intelligent scissors approach of the prior art uses dynamic training techniques. During dynamic training, characteristics about a last generated live-wire segment are stored. When a next boundary point is selected, the boundary edge having the most similar characteristics with the previous live-wire segment is selected.

One drawback of dynamic training is that, since it is based on the edge characteristics from the last live-wire boundary, it is less effective for those objects with inconsistent or changing edge characteristics. In fact, training can be counter productive for objects with sudden and dramatic changes in edge features. As such, training is often turned on and off, depending upon the edge characteristics of an object.

SUMMARY OF THE INVENTION

A video editing system capable of tracing and extracting objects in an image selects edges of the object to be traced based on an edge cost computation and on a rotational amount of the edge. The edge cost calculation method modulates the gradient magnitude of the pixel against the gradient direction of an edge to reduce the ambiguity often encountered during tracing as a result of background noise in the image. A method of editing and improving the trace involves introducing control points between previously generated points in the trace.

One aspect of the invention is a method for tracing an object in an image. This method includes the steps of selecting a first point on an edge of the object, selecting a second point on an edge of the object, and selecting a path from the first point to the second point responsive to a total rotation of the path. By using a consistent edge selection criteria based on a rotational amount of an edge, subsequent editing of the trace may be performed while ensuring that edges which do not require modification are preserved.

Another aspect of the invention is a method for editing a trace of an object in an image, where the trace comprises a plurality of lines drawn between a plurality of points on the boundary of the object. This method includes the steps of inserting a control point between two points on the boundary of the object, and determining a path from the control point to each of the two points on the boundary, wherein the lines between other points on the boundary of the image are unchanged. Thus, specific areas of the trace may be refined while still preserving the other trace boundaries. By providing a method for amending a trace after creation, the complex training mechanisms used in the prior art may be avoided.

DETAILED DESCRIPTION

Figure 2:
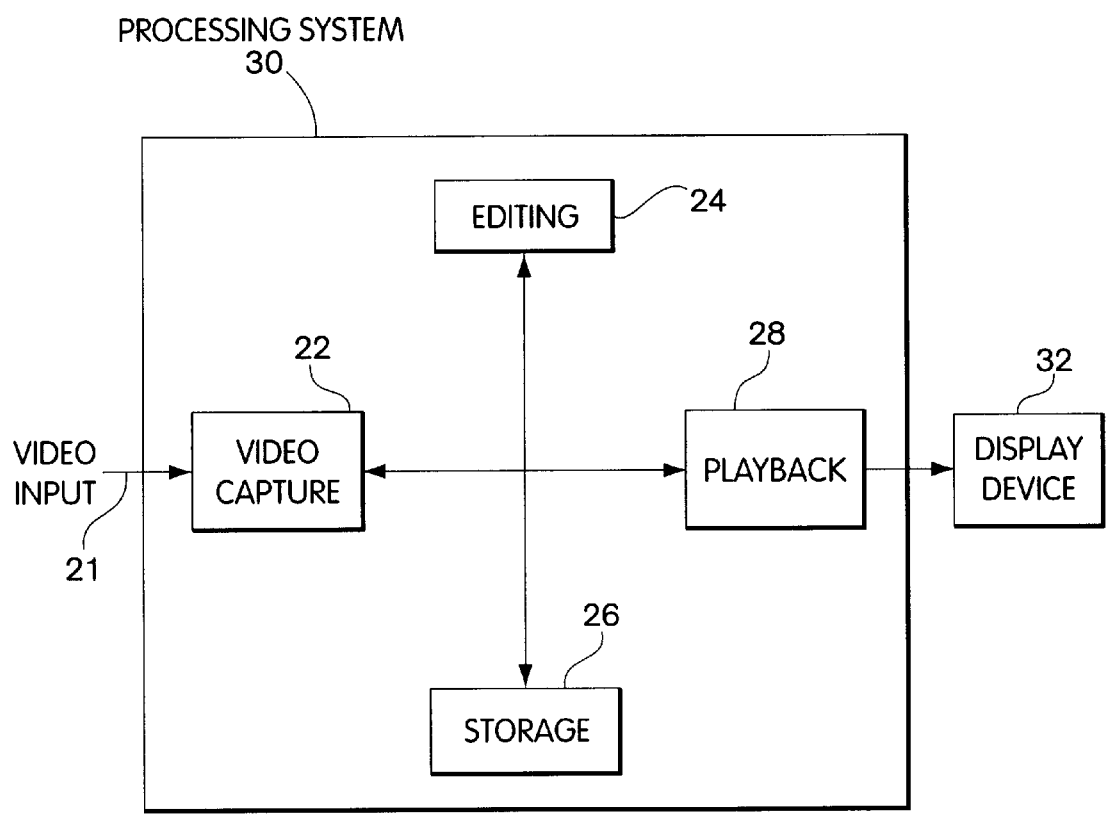
FIG. 2 illustrates a video editing system for use in the present invention.

Referring now to FIG. 2, a system for receiving, editing and displaying video film images is shown to include a processing system 30 coupled to receive input from a video input line 21 and display an output image on a display device 32. The processing system 30 is shown to include a number of components. Each of these components may be comprised of a combination of hardware and software elements.

The video input stream received on line 21 may be comprised of a series of video frames received in NTSC or PAL format. Each of the video frames comprises information representing the image that is displayed in that frame. In addition, associated with each frame is a time code for indicating the relative position of that frame within the video stream. The time code is useful for selecting desired frames during the editing process.

The video input is received by video capture unit 22. The video capture unit 22 converts the video input stream into digital form and compresses the video stream for storage in a storage device 26. A compression technique that is typically used for video input is the JPEG or MPEG compression protocol. Alternatively, for improved accuracy in tracing, frames may be stored directly without compression in storage unit 26. Storage unit 26 may be a memory device comprised of static or dynamic random access memory or may be disk storage, optical disk storage, or the like.

Once all of the desired video frames have been captured and stored, the input video image may then be edited by an editing unit 24. The editing unit 24 is typically comprised of software routines which are able to track the video image and selectively cut and paste frames in a desired playback order to form a final edited version of film that may be displayed by a play back system 28. During editing, frames are displayed by the playback device 28 on the display device 32. The display device 32 may be a CRT, television screen, or the like.

A variety of functions are capable of being performed by the editing system 24. For example, frames may be placed in different orders, and fade in and fade out effects may be added to smooth the overall result. However, editing is not done solely on a frame granularity. Editing of objects within a frame may also be provided using digital image composition techniques. Using digital image composition, objects may be cut from a first frame, or a still image, and inserted into another frame. In movies, image composition, combined with other digital manipulation techniques, have been used to realistically blend old film into new script and vice versa. The goal of image composition is to combine objects or regions of various still photographs or movie frames to create a believable image or image sequence that appears convincing.

When selecting objects from an existing frame, or image, the objects of interest must be extracted and segmented from a surrounding background of unpredictable complexity. Manual techniques and prior art computer techniques have proved to be time consuming and frustrating or have produced less than optimal results.

Figure 3:
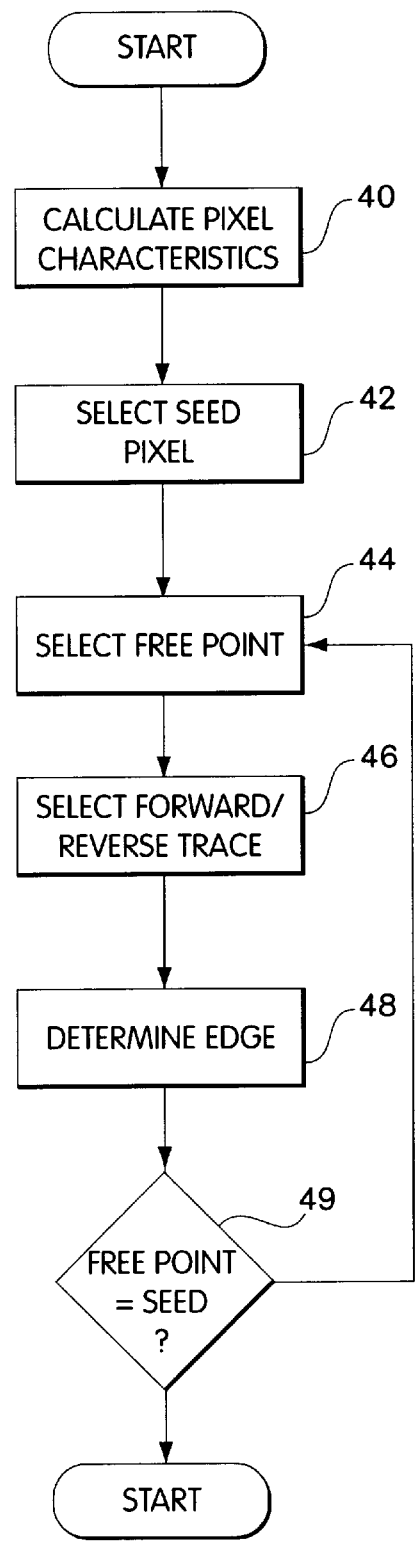
FIG. 3 is a flow diagram illustrating steps used in one embodiment of the tracing method of the present invention.

Referring now to FIG. 3, a flow diagram of an assisted tracing tool in one embodiment of the present invention is shown. The steps performed by the tracing tool in this embodiment are implemented in software, a copy of which is reproduced below, that operates on any Windows® NT or Windows® 95 workstations. At step 40, each pixel of the image, or frame, is analyzed to determine certain characteristics of that pixel with regard to neighboring pixels. In the equations below, the pixel in question is pixel p, and a neighboring pixel is indicated as pixel q. These characteristics include a gradient magnitude G(p) for the pixel, a gradient direction GD(p) at a pixel, an edge orientation E(p) of the pixel, and laplacian zero crossing characteristics Z(p) of the pixel.

The gradient magnitude characteristic of the pixel provides a correlation between edge strength of the pixel and a cost of the pixel. If Ix and Iy represent the partials of an image I in x and y respectively, then the gradient magnitude G may be defined using the below equation I:

$$G = \sqrt{I_x^2 + I_y^2} \qquad \text{Equation I:}$$

The gradient direction GD(p) of pixel p is the pathway out of pixel p that has the highest gradient magnitude. The edge orientation E(p) represents the angle from horizontal of the line which is perpendicular to the gradient direction of p. Thus, the values of E(p) range from $-\pi/2$ to $\pi/2$.

The Laplacian zero-crossing characteristic Z(p) is used to indicate the edge properties at the pixel p. The image is first convolved with a laplacian kernel to approximate the 2nd derivative of the image. A laplacian zero crossing occurs across an edge and thus has a low associated cost. Thus the value of Z(p) is 0 if there is not a laplacian zero-crossing at p, and 1 if there is a laplacian zero crossing at p.

During the calculation of initial pixel characteristics, user controlled variables are also initialized. These variables include a tension variable $\lambda_0$, a gradient response gamma $\lambda_1$, a gradient direction influence $\lambda_2$, a gradient magnitude influence $\lambda_3$, and a zero crossing influence $\lambda_4$. Each of these inputs allows for the user to control the impact of each of the pixel characteristics on during the boundary selection process.

At step 42, once the initial characteristics of the pixel have been determined, then at step 42 the user selects a seed pixel on the edge of an image. The seed pixel is the origin pixel of the trace of the image. As the trace progresses, lines are traced from successive points along the edge of the boundary back to the seed pixel.

Referring now to FIGS. 4A–4D, an image 50 is shown to comprise a number of pixels, with each pixel indicated by a value representing a color of the respective pixel. A user at a workstation selects a seed pixel such as seed pixel 52 on the edge of an object using an input device such as a mouse, keypad, or other such input device.

Referring back to FIG. 3, once the seed pixel 52 has been selected, at step 44 a next 'free' point is selected along the edge of the object. The free point may be explicitly selected by having a user select a pixel using a mouse or other such device at a point along the edge of the pixel. Alternatively, a user may trace along the edge in a constant motion, with free points being placed at intervals along the object edge.

Once a free point is selected, at step 46 the direction of the trace is determined. The trace may progress in either a forward direction, for example, from a seed point to a free point, or in a reverse direction, from a free point back to the seed point. The selection of trace direction is user dependent. However, as will be described more thoroughly below, the present invention provides a mechanism for ensuring that, no matter which direction is selected for the trace, the same exact path will be selected between the two points.

Once the trace direction is selected, at step 48 an edge between the seed point and the free point is selected. The process used for edge selection will be described with reference to FIGS. 4B–4D and the flow diagram of FIG. 5 below. Once an edge is generated between the two points, then, at step 49 it is determined whether the last free point was equal to the seed pixel. If it is, then the trace is complete. If not, then the process proceeds to step 44, where a new free point is selected, and a new edge trace is generated. This process continues until the entire object has been traced.

Figure 4A:
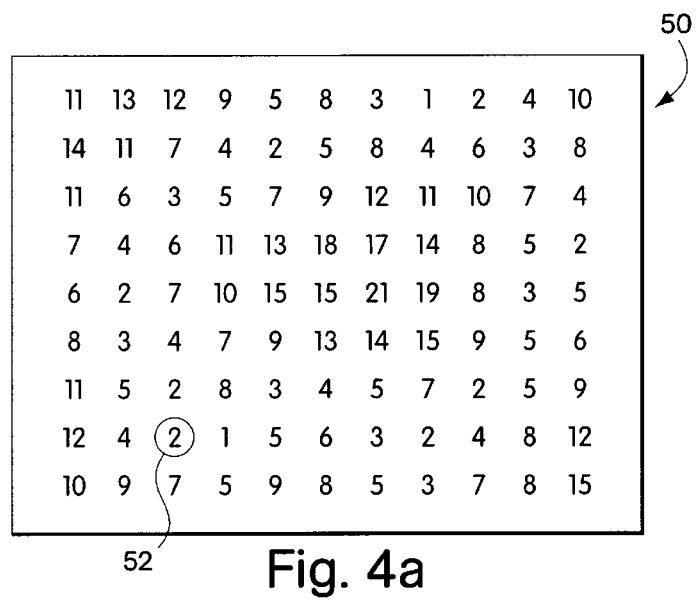
FIG. 4 is an illustration of an image for illustrating an edge analysis method used in the tracing method of the present invention.
Figure 4B:
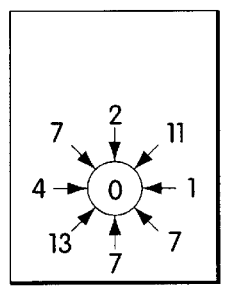
Figure 4C:
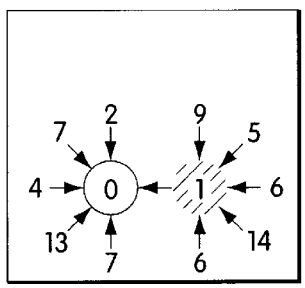
Figure 4D:
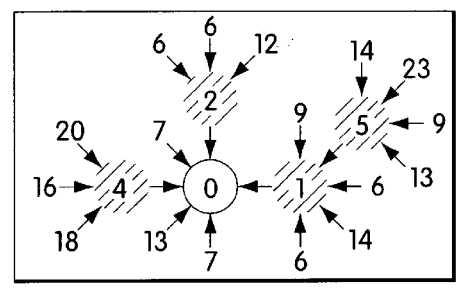

To select the appropriate edges, the seed pixel is used to build an expanding wave through neighboring pixels to that free point. As shown in FIG. 4B, arrow indicators represent the paths from a given neighboring pixel to the seed pixel. The first step is to determine the costs of all of the neighboring pixels back to the seed pixel. Once these costs are determined, an edge is selected, and then the lowest cost neighboring pixel is analyzed, with the costs of its neighbor pixels being calculated. This process continues as shown in FIGS. 4C and 4D, thereby creating an expanding wave front of paths back to the original seed pixel. Note that in FIGS. 4B–4D, the costs of the pixels change in accordance with the Euclidean weighting between the seed and diagonal neighboring points.

A combination of the generated information, such as the gradient magnitude G(p), the gradient direction GD(p), the edge direction E(p), and the laplacian characteristic Z(p) is used to select the lowest cost path to a seed pixel. In addition, a running total of the rotation of the path from the seed pixel may be maintained in order to facilitate selection of a desired edge.

Figure 5:
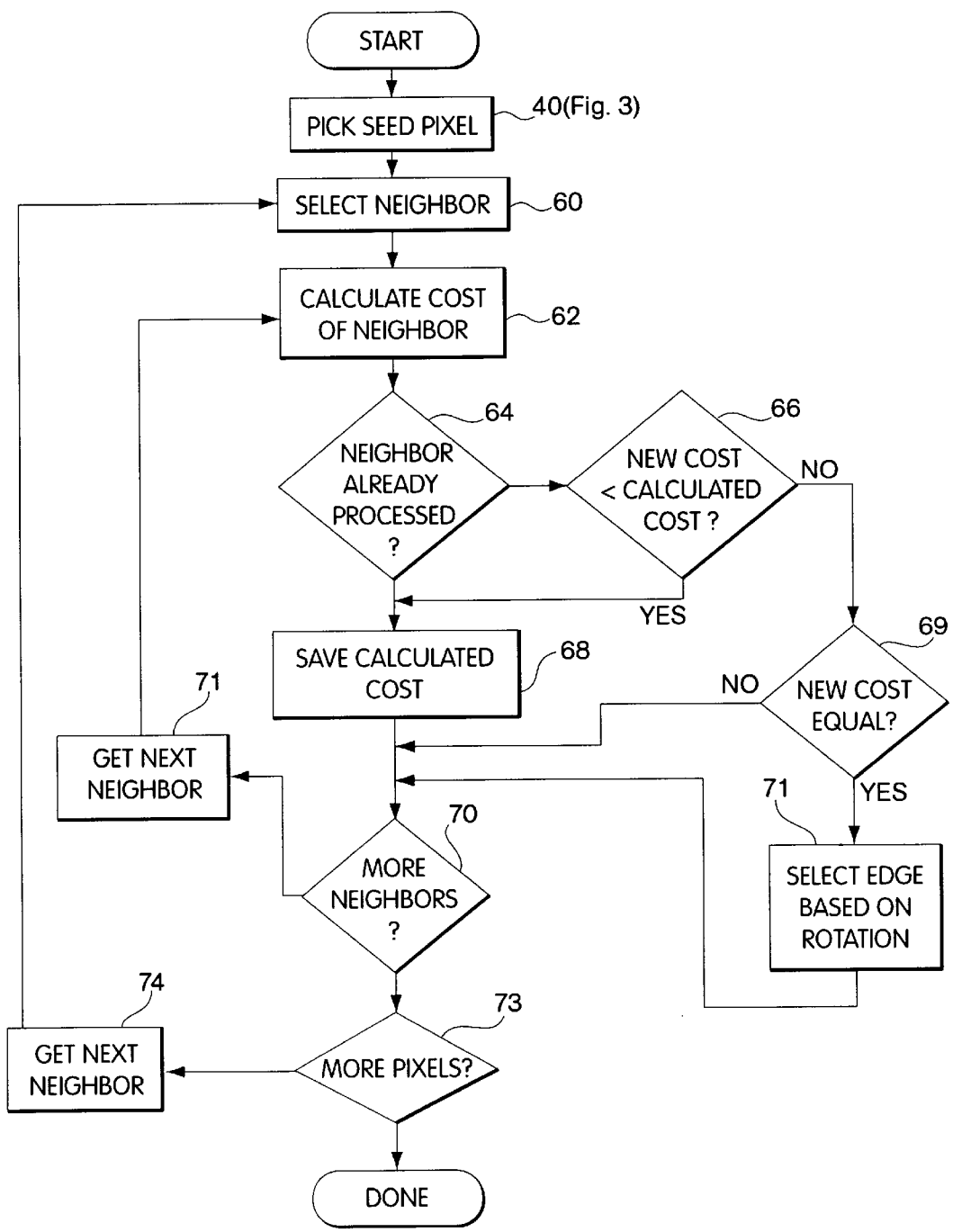
FIG. 5 is a flow diagram illustrating a method for determining a cost of an edge in the edge analysis method of FIG. 4.

Referring now to FIG. 5, a flow diagram for illustrating the process used to select an edge is provided. At step 42, as described in FIG. 3, a seed pixel was selected. At step 60, one of the 8 neighbors q of seed pixel p is selected for cost calculation. At step 62, the edge cost between the seed pixel p and the neighboring pixel q is calculated. First, an orientation of a line drawn between pixel p and neighboring pixel q is determined and stored in variable $\theta(p,q)$. The value of $\theta(p,q)$ is either $-\pi/4$, 0, $\pi/4$, or $\pi/2$ (thus indicating offsets of 0 degrees, ±45 degrees and 90 degrees). A direction variable D(p,q) is generated from the $\theta(p,q)$, where D(p,q) equals $\sqrt{2}$ if $\theta(p,q)$ equals $\pm\pi/4$, or 1 if $\theta(p,q)$ equals 0 or $\pi/2$. An additional variable, $\chi(p,q)$ is generated, where $\chi(p,q)$ is the lesser of $|\theta(p,q)-E(p)|$ or $\pi-|\theta(p,q)-E(p)|$.

Once these variables have been generated for the pixel/neighbor pair, the cost C(p,q) of traversing the edge between pixel p and neighbor q is defined by Equation II below:

Equation II:

$$\text{Multiplier}(p,q) = \lambda_3 + \lambda_4 Z(p) + \lambda_2(\pi - 2\ \chi(p,q))/\pi$$

$$\text{Halfcost}(p,q) = D(p,q)\ (\lambda_2 + \lambda_3 + \lambda_4 - (1-\lambda_0) \cdot G(p)^{\lambda_1} \cdot \text{Multiplier}(p,q))$$

$$\text{Halfcost}(q,p) = D(q,p)\ (\lambda_2 + \lambda_3 + \lambda_4 - (1-\lambda_0) \cdot G(q)^{\lambda_1} \cdot \text{Multiplier}(q,p))$$

$$\text{Cost}(p,q) = \text{Halfcost}(p,q) + \text{Halfcost}(q,p)$$

The costs for neighboring pixels are stored in a list in memory of the processing system 30 (FIG. 2).

At step 64, once the cost for the edge is calculated, it is determined whether or not that edge has a cost value already associated with it, from processing another pixel. If so, at step 66 it is determined whether the newly calculated cost is a lower cost than that previously calculated. If the newly calculated cost is lower, or if a cost has not been previously assigned to that edge, then that cost is saved for that edge at step 68. If the newly calculated cost is not lower, then at step 69 it is determined whether or not the cost is equal to the previously generated cost. If not, then the process proceeds to step 70. If the new cost is equal, then the optimum path is selected based on a desired rotation amount at step 71, as will be described in greater detail below.

If the cost of a neighboring pixel is the same as that generated in a previous analysis of the pixel, it must be determined which edge is the preferred edge to the neighboring pixel. In order to reduce path ambiguity, the selection of a path to a neighboring pixel is made based upon the rotation between the seed pixel and the neighboring pixel, as compared to the rotation on the equal cost path to the neighboring pixel. The desired rotation amount changes depending upon whether a forward or reverse trace is being performed. For a forward trace, the edge having a maximum desired rotation is selected. For a backwards trace, the edge having a minimum desired rotation is selected.

Figure 6:
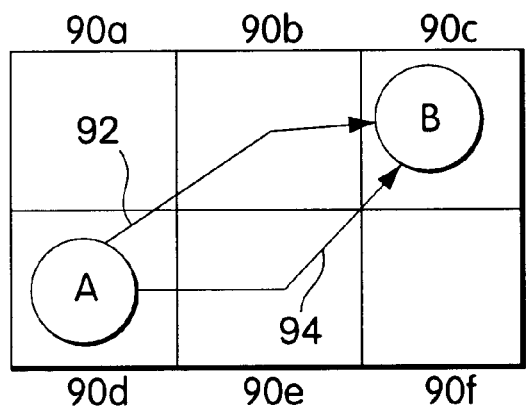
FIG. 6 is an illustration of a portion of an image used for illustrating edge selection method according to the present invention.

For example, referring now to FIG. 6, an example segment of an image 88 is shown to comprise 2 rows of three pixels. Assume pixel 90*d* is seed pixel, and pixel 90*c* is a free pixel. A path must be selected between the seed pixel 90*d* and the free pixel 90*c*. In this example, two paths, 92 and 94 have identical edge costs. Thus, either edge may be selected for traversing from the seed point to the free point 90*c*.

Rotational values resolve ambiguous paths and thus allow a consistent one of these edges to be selected for both forward and reverse tracing. For example, referring now to FIG. 7, an example pixel 96 is shown with its surrounding neighboring pixels 96a–96h. An input edge to pixel 96 is received from neighboring pixel 96d. The amount of rotation is measured relative to the input path, and in increments of 45 degrees. Thus, in the example shown in FIG. 7, the rotation from input path 96d to output path 96h is 0. The rotation from input path 96d to output path 96e is −3. The rotation from input path 96d to output path 96a is +1, and so on.

Figure 7:
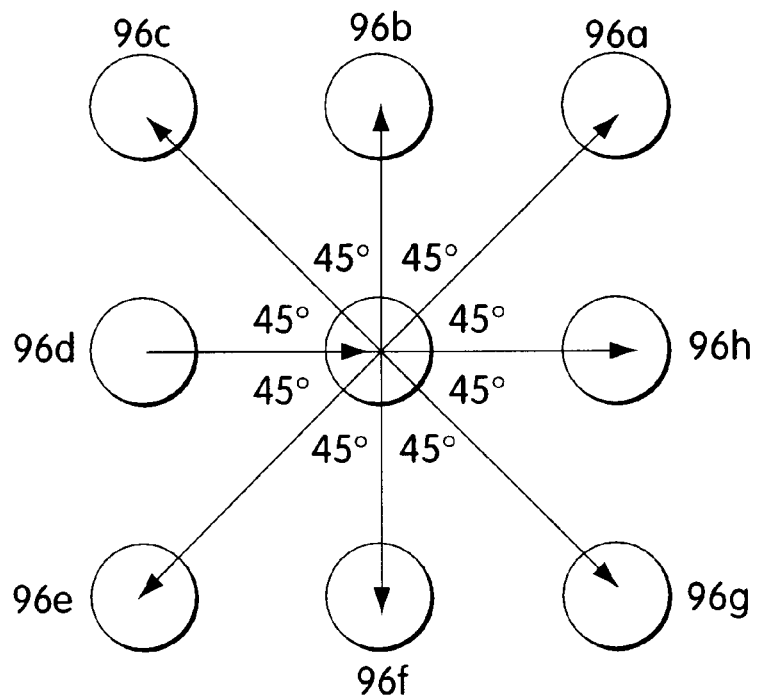
FIG. 7 is an illustration of a pixel and neighboring pixels for illustrating a rotation component used in the edge selection method described in FIG. 7.

The rotation amounts shown in FIG. 7 may be used to determine the selected, minimal cost path in FIG. 6. For example, the rotation along path 92 is a +1 from 90d to 90b, and a −1 from 90b to 90c. The rotation along path 94 is a 0 from 90d to 90e, and a +1 from 90e to 90c. Thus, path 94, having the highest rotation during a forward trace, would be selected as the path for tracing.

In the event that a control point was subsequently added, and that this path was reverse traced from pixel 90c to 90d, an identical path would be obtained by ensuring that the path with the highest rotation value is selected. For example, to reverse traverse path 92, the rotation from pixel 90c to 90b is 0, and the rotation from pixel 90b to 90d is ±1. To reverse traverse path 94, the rotation from pixel 90c to 90e is ±1, and the rotation from pixel 90e to 90d is ±1. Thus, path 94, having the minimum rotation of −0 for a reverse trace, is again selected.

During operation, as the trace is calculated, a total rotation, from the seed pixel through all of the free points, is maintained and stored in a memory of the computer system. At each pixel, a path direction into the pixel is retrieved, and the rotations of the neighboring pixels are determined relative to the direction of the input path. It should be noted that, although it has been described that a forward trace searches for a highest rotation, and a reverse trace searches for a lowest rotation, the desired rotation levels may be switched to provide consistent results.

Referring back to FIG. 5, once an edge has been selected at step 71 according to the cost and rotation values, then, at step 70, it is determined whether all of the neighbors of the seed pixel have been processed. If not, then at step 72 the next neighbor is selected, and steps 62 through 70 are repeated until no more neighbors require analysis. Next, at step 73 it is determined whether all of the pixels in the image between a seed point and the free point have been processed. In particular, it is determined whether the free point has been processed or not. If not, at step 74 the lowest cost pixel from the previous analysis is selected, and the steps of 60 through 73 are repeated until the free point has been processed.

The edge selection technique described above overcomes the problems of the prior art by modulating the gradient magnitude cost of the pixel by the gradient direction of the pixel. With such a result, the relative weakness of some boundary edges as compared against a nearby object may be enhanced using the gradient direction information, thus reducing the chances that an incorrect boundary edge will be selected.

In addition, because an edge is selected according to a desired rotation amount, it can be assured that a consistent pathway is always selected for forward and reverse tracing. Because a consistent path is always selected, editing of specific portions of the trace may be performed without affecting the remaining trace.

For example, as indicated above, one desired goal is to provide a minimal cost (accurate) path at high speed. It can be appreciated that the accuracy of a trace of an object is related to the number of free points that surround the object. The fewer the free points, the more jagged the trace. According to one aspect of the present invention, additional control points may be added in between existing points to enhance the trace result.

One problem with inserting control points into an existing trace, or moving control points within the trace, is that the minimal path wave front has already been generated for the previous free points. As was shown above, the computations required to generate the wave front are complex and time consuming. In addition, it may be that some of the edges that were generated in the previous trace were satisfactory. However, since there are typically many paths between pixels, it may be that during the subsequent generation of the wave front, a different path that has the same cost as an original path is selected for the trace. Thus, inserting control points could result in a change in the state of the previous edges to undesirable locations around the boundary.

Because edges are selected based not only on their cost, but also on their rotational amount, it can be assured that, given two points in an object, only one path will be selected between those two points, regardless of the direction of tracing between the points. Because the same path is always generated, the addition of an additional control point between two free points will not affect the selected trace paths between other free points in the trace. As a result, original characteristics of the image may be preserved.

Figure 8A:
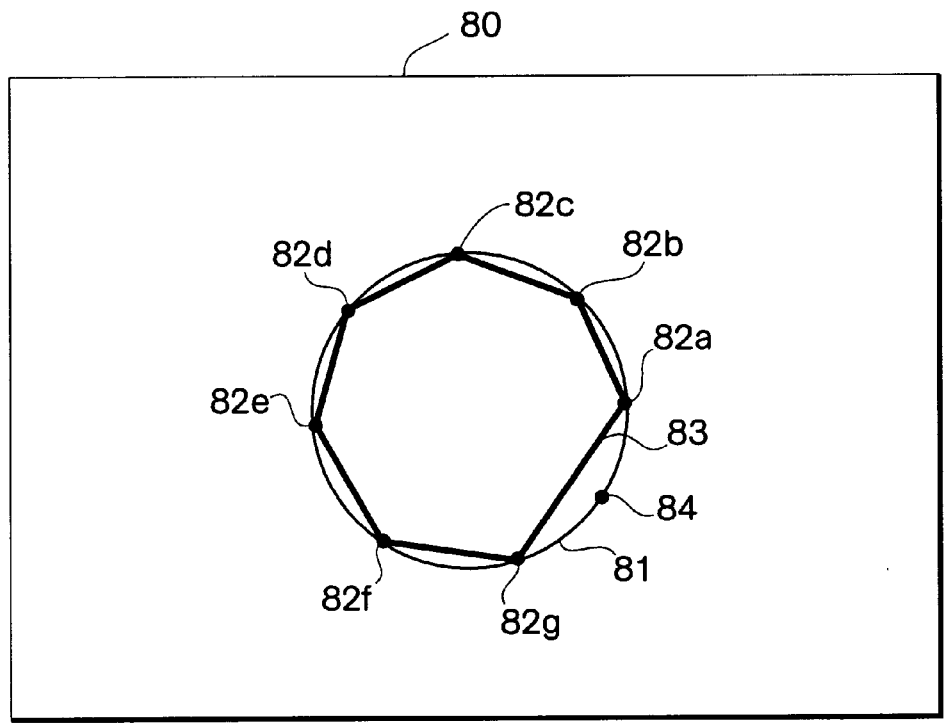
FIGS. 8A and 8B are illustrations of an object in an image for illustrating a boundary tracing editing technique according to the present invention.

For example, referring now to FIG. 8A, an image 80 is shown having an object 81 to be traced. A user inputs a seed point 82a and free points 82b–82g along the boundary edge of the object 81, providing a resulting trace 83. Assume that forward tracing was used to generate the trace.

Figure 8B:
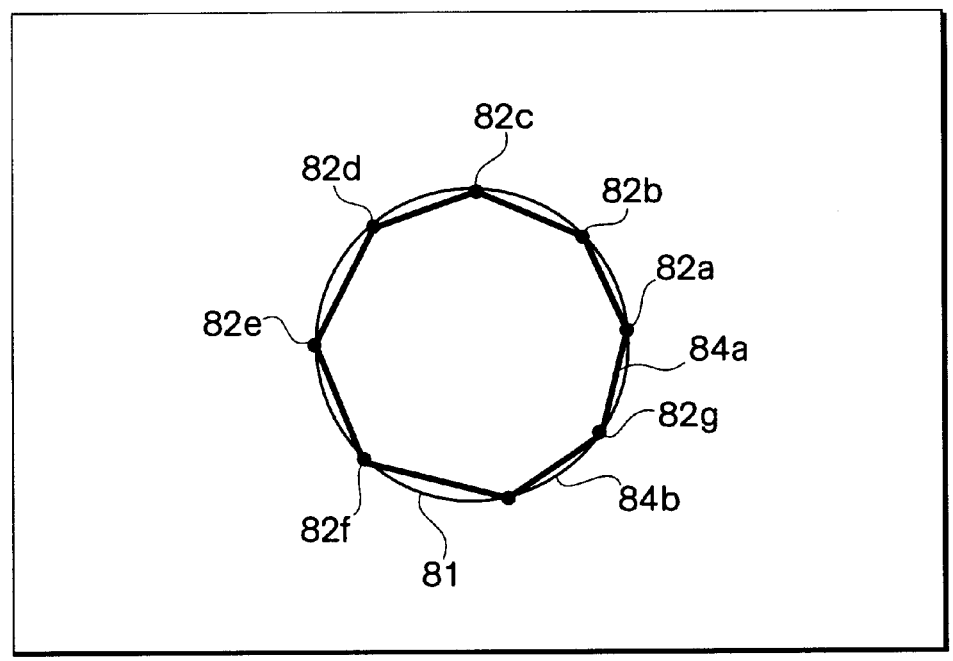

To improve the trace, a free point 82g could be moved to a better location along the boundary of the object, such as to point 84. Alternatively, a control point, such as point 82g' of FIG. 8B, could be added between free point 82g and seed point 82a. Some portions of the trace between 82g and 82a are satisfactory, and it would be desirable not to alter those portions of the trace. When free point 82g' is added, the paths between the previous location of 82g and the new location are recomputed, using forward tracing. Thus, the original portions of the trace close to point 82g will be preserved as the wave form extends to the new point 82g' location.

The movement of point 82g' also causes the path between seed pixel 82a and the new 82g' location to be recalculated. In this example, reverse tracing is used to generate the new pathway. Because the above described method selects an identical path, regardless of the trace direction, the portions of the path closest to seed point 82a will be preserved. In addition, only a portion of the wave front need be regenerated, thus providing a fast and efficient editing process.

Figure 1:
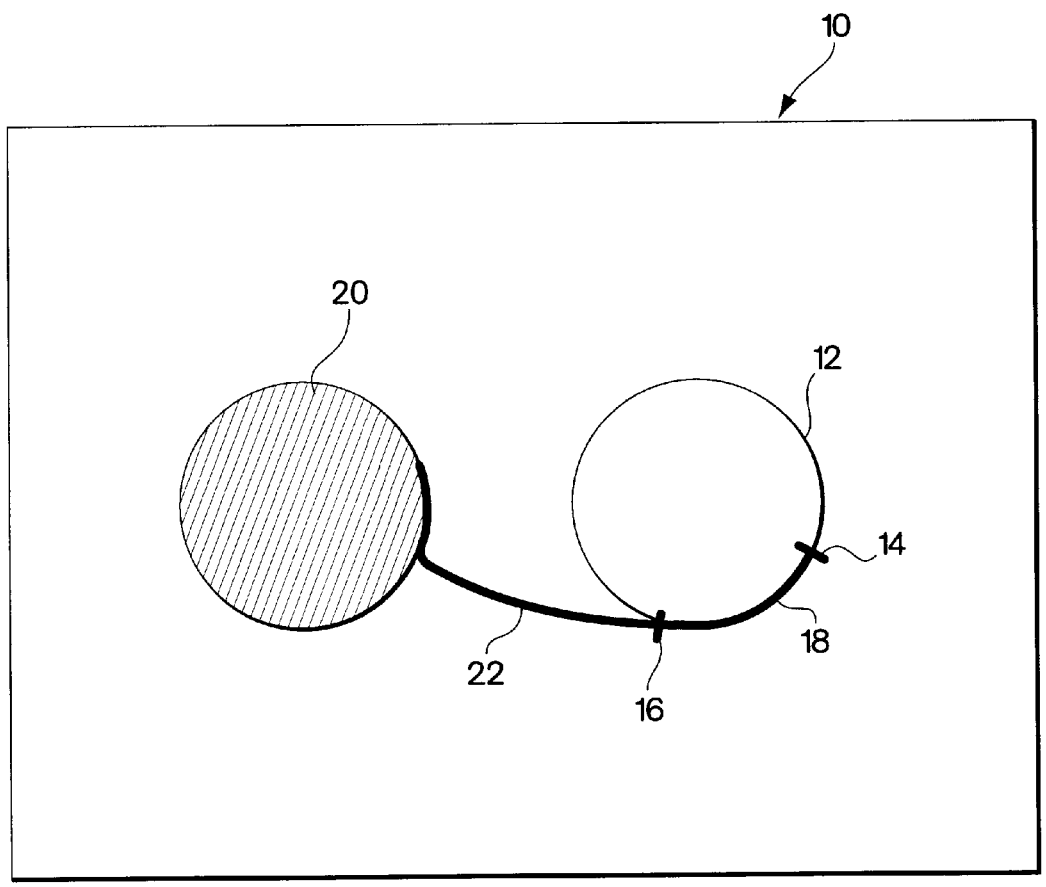
FIG. 1 is an illustration of an object in an image used for illustrating a boundary tracing method according to the prior art.

Once an object has been traced, it may be extracted from the background of the image, then stored in the storage 26 (FIG. 1) of the video processing system 10 for later insertion in another video frame, or for manipulation by other editing tools. The object data is stored in a data structure as defined in the xpscissors_scissors.h routine of the code reproduced below. An edge cost calculation method, which modulates the gradient magnitude of the pixel against the gradient direction of an edge, reduces the ambiguity often encountered when tracing as a result of background objects and other noise in the image. A method of introducing control points between previously generated points in the trace is provided that preserves the previous trace results by ensuring that a consistent selection criteria is used to resolve path ambiguity. By basing the selection criteria on a rotation of the path, a total path rotation may be maintained with minimal extra compute operations. In addition, it should be noted that the above method may be used not only for encompassing objects for removal from an image, but also for tracing portions of objects for later manipulation of that portion of the object.

The foregoing embodiments are merely illustrative and not meant to be limiting, having been presented by way of example only. Numerous modifications and other embodiments are within the scope of one of ordinary skill in the art and are contemplated as falling within the scope of the invention as defined by the appended claims and equivalents thereto.

APPENDIX A

```
/* $Author: dickie $
 * $Date: 1997/01/23 16:00:55 $
 * $Header: /home/eng/devel/src/xp/xpscissors/xp/RCS/xpscissors_scissors.h,v
 1.10 1997/01/23 16:00:55 dickie Exp $
 * $Locker: $
 * $State: Exp $
 * $Log: xpscissors_scissors.h,v $
 * Revision, 1.10 1997/01/23 16:00:55 dickie
 * split up the ProcessPixel inner loop into inline functions so that
 * it is easier to understand.
 *
 * Revision 1.9 1996/12/06 22:54:38 dickie
 * sanity check
 *
 * Revision 1.8 1996/10/29 21:19:58 dickie
 * *** empty log message ***
 *
 * Revision 1.7 1996/10/29 21:12:41 dickie
 * *** empty log message ***
 *
 */
#ifndef XPSCISSORS_SCISSORS_H
#define XPSCISSORS_SCISSORS_H
#include "xpscissors_image.h"
#include "xpstack"
//    XPScissorsI implements the underlying graph search algorithm from the paper
//    "Intelligent Scissors for Image Composition", by Eric N. Mortensen and
//    William A. Barrett, Computer Graphics Proceedings 1995, pp 191–198.
//
//    It should be possible to implement several different user interfaces based
//    on this class, including the live-wire interface described in the paper.
//    This class encapsulates an algorithm and maintains some large private data
//    structures. It is not designed to be extended. Instances should not be
//    copied, folded, spindled, or mutilated -- always pass XPScissorsI objects
//    by pointer or reference. (This is enforced through the use of a private
//    copy constructor and operator = ( XPScissorsI & )).
class XPScissorsI {
    //    The following are for debugging purposes; the functions mentioned
    //    appear in the filters.cpp file included in my testbed version of
subrect.
    friend void ScissorsFlagsInPlace( ImageBuffer * buffer, long quanta,
long check );
    friend void ScissorsCostInPlace( ImageBuffer * buffer, long arg );
public:
    //    See the file xpscissors_client.h for comments on the public
methods.
    XPScissorsI( const XPScissorsImageI & image );
    ~XPScissorsI( );
    void ImageSet( );
    bool SetSeedPixel( XPPoint seed, XPScissors::ReversePolylinesFlag
reverse );
    void ClearSeedPixel( );
    bool ComputeQuantum( );
    bool ComputeAll( );
    bool ComputeToTargetPixel( XPPoint target );
    bool TargetPixelIsReady( XPPoint target ) const;
    bool GetPolylineFromTargetPixelToSeedPixel( XPPoint target, PointVector
& polyline );
    void SetZeroCrossingInfluence( double zeroCrossingInfluence );
    void SetGradientMagnitudeInfluence( double gradientMagnitudeInfluence
);
    void SetGradientDirectionInfluence( double gradientDirectionInfluence
);
```

APPENDIX A-continued

```
        void SetGradientResponseGamma( double gradientResponseGamma );
        void SetTension( double tension );
        double GetZeroCrossingInfluence( ) const;
        double GetGradientMagnitudeInfluence( ) const;
        double GetGradientDirectionInfluence( ) const;
        double GetGradientResponseGamma( ) const;
        double GetTension( ) const;
private:
        //   Enforce restrictions on copying: (these methods have no
definition, just a declaration)
        XPScissorsI( const XPScissorsI & );
        XPScissorsI & operator = ( const XPScissorsI & );
        //   3-bit encoding of directions in the plane.
        enum Direction {
            kDirectionN = 0,
            kDirectionNE,
            kDirectionE,
            kDirectionSE,
            kDirectionS,
            kDirectionSW,
            kDirectionW,
            kDirectionNW,
            kDirectionCount
        };
        static const double kDefaultZeroCrossingInfluence;
        static const double kDefaultGradientMagnitudeInfluence;
        static const double kDefaultGradientDirectionInfluence;
        static const double kDefaultGradientResponseGamma;
        static const double kDefaultTension;
        static const double kMaximumGradientResponseGamma;
        static const double kMaximumTension;
        static const double kMinimumZeroCrossingInfluence;
        static const double kMinimumGradientMagnitudeInfluence;
        static const double kMinimumGradientDirectionInfluence;
        static const double kMinimumGradientResponseGamma;
        static const double kMinimumTension;
        //   Maintenance for the relative feature costs and the tables that
they effect:
        //
        //   The actual maximum cost values are kept as unsigned chars, with
the three costs
        //   always summing to 255. These are recomputed as needed, along with
some tables.
        enum {
            //   Constants describing the total cost which we wish to
compute, to go from p to q.
            kCostCount = 0x100,                                     //
There are 256 possible cost values.
            kDiagonalMaximumCost = 0xFF,                            //    Cost
is in the range 0 to 255.
            kXYMaximumCost = 0xB4,
            kMaximumGradientMagnitudeValue = 0x10000,   //          Gradient
magnitude is converted to a value in the range 0 to 0x10000,
            kDiagonalMaximumMultiplier = 0xFE00,                    //
multiplied by a multiplier to get a value in the range 0 to 0xFE000000,
            kXYMaximumMultiplier = 0xB300,                          //
    (or 0 to 0xB3000000 for costs in xy directions),
            kMultiplierOffset = 0x800000,                           //    plus
a half, and shifted to get a value in the range 0 to 0xFE. (This
            kMultiplierShift = 24,                                  //
    leaves 1 for "epsilon" -- the zigzag cost.)
            //   Constants used with the zero crossing and gradient magnitude
tables.
            kMaximumGradientMagnitude = 0x7F,                       //
Maximum value for the gradient magnitude part.
            kGradientMagnitudeCount = 0x80,                         //
    Number of possible values for the gradient magnitude part.
            kGradientMagnitudeMask = 0x7F,                          //
    Mask to get just gradient magnitude from
zeroCrossingAndGradientMagnitude byte.
            kZeroCrossingMask = 0x80,
            kZeroCrossingAndGradientMagnitudeCount = 0x100,  //     Number of
possible values for the zeroCrossingAndGradientMagnitude byte.
            kGradientMagnitudeTableCount = 2,                  //   Number
of different cost tables needed. (one for diagonal, one for xy).
            //   Constants used with the gradient direction tables.
            kMaximumGradientDirectionIndex = 0x80,              //   0 to
128 give increasing costs, then costs start to decrease.
```

APPENDIX A-continued

```
        kGradientDirectionCount = 0x100,               // Number
of possible values for the gradientDirection byte.
        kGradientDirectionTableCount = 8,              // Number
of different cost tables needed. (one for each direction).
        kGradientDirectionMask = 0x3,                  // Mask
to get cost table index from direction.
        kDiagonalMask = 0x1,
        kpi = 0x100,
        k3piOver4 = 0xC0,
        kPiOver2 = 0x80,
        kPiOver4 = 0x40,
        kPiMask = 0xFF,
    };
    XPScissors::ReversePolylinesFlag mReverse;
    bool              mCostsDirty;
    bool              mseedDirty;
    double            mzeroCrossingInfluence;          // These
values are set by the user, or can be, and determine the
    double            mGradientMagnitudeInfluence;     //
relative weights given to the three cost functions. (arbitrary range; weights
taken vs. total)
    double            mGradientDirectionInfluence;
    double            mGradientResponseGamma;          //
    a gamma value of 1.0 is linear; bigger highlights strong edges, smaller
but > 0 brings up weaker edges.
    double            mTension;
//  between 0.0 and 1.0, minimum cost of an edge out of a maximum of 1.0
    unsigned long     mDiagonalZeroCrossingMultiplier;
    unsigned long     mDiagonalMaximumGradientMagnitudeMultiplier;
    unsigned long     mDiagonalMaximumGradientDirectionMultiplier;
    unsigned long     mXYZeroCrossingMultiplier;
    unsigned long     mXYMaximumGradientMagnitudeMultiplier;
    unsigned long     mXYMaximumGradientDirectionMultiplier;
    //  The mGradientDirectionMultiplier values include the
gradientMagnitude multiplier, (half of it, since two
    //  values from table are used at each pixel), with the diagonal range
used for diagonal directions and the xy
    //  range used for xy directions.
    unsignedlong      mGradientDirectionMultiplier[
kGradientDirectionTableCount ] [ kGradientDirectionCount ];
    //  The mGradientMagnitudeValue lookup table is where any non-
linearity in the response to gradient magnitude
    //  is encoded.
    unsigned long     mGradientMagnitudeValue [
kZeroCrossingAndGradientMagnitudecount ];
    //  Miscellaneous constants:
    enum {
        //  Constants describing the encoding used for the flags byte
kept for each pixel.
        kCostMask = 0xFF,
        kVisitedThreshhold = 0xF0,                    // High 4 bits are set
until first time pixel is visited.
        kNotVisitedBits = 0xF0,                        // High 4 bits are set
until first time pixel is visited.
        kVisitedShift = 0x3,                           // Upon first visit, shift
word left by this to put boundary value into bits 6 through 3.
        kNotExpandedMask = 0x80,                       // High bit is set until
pixel is pulled from wavefront and expanded.
        kDirectionMask = 0x7,                          // After the first visit,
the low 3 bits hold direction to parent pixel.
        kUnvisitedBoundaryMask = 0xF,    //   Before the first visit, the
low 4 bits hold boundary information.
        kVisitedBoundaryMask = 0x78,     //   After the first visit, these
bits hold it.
        kVisitedNotOnBoundary = 0x40,    //   And those 4 bits are 1000
for non-boundary pixels.
        kQuantum = 1000                               // Number of pixels
to process at a time in ComputeQuantum.
    };
    bool PixelIsNotVisited( long p )            {return mFlags[ p ] >=
kVisitedThreshhold; }
    bool VisitedPixelIsOnBoundary( long p ) {return ( mFlags[ p ] &
kVisitedBoundaryMask ) == kVisitedNotOnBoundary; }
    long VisitedPixelParent( long p )           {return p + mDirectionOffset[
mFlags [ p ] & kDirectionMask ]; }
    //  For each of the 72 possible values of the low 7 bits of the flags
byte (high 4 are either a direction
    //  indicating which boundary the pixel is on or kDirectionCount
indicating that the pixel is not on a
```

APPENDIX A-continued

```
    //   boundary, and low 3 are the direction to the pixel's parent
pixel), a list of the directions to be
    //   checked for neighbors which have not been processed.
    static const unsigned char kDirection[ ] [ kDirectionCount ];
    //   For the seed pixel, need to know if it is on a boundary, so use
the low 4 bits as first index.
    static const unsigned char kSeedPixelDirection[ ] [ kDirectionCount + 1
];
    //   For the seed pixel, a safe direction to pretend it has a parent
in.
    static const unsigned char kSafeDirection[ ];
    long                mDirectionOffset [ kDirectionCount ];        //
    Offsets to pixel indices (computed based on mBufferWidth).
    static const long kDirectionOffsetX[ kDirectionCount ];          //
Offsets to x coordinate.
    static const long kDirectionOffsetY[ kDirectionCount ];          //
Offsets to y coordinate.
    //   Precomputed values describing the costs for each pixel and edge:
    const XPScissorsImageI & mImage;
    //   These are copied from the mImage structure by the ImageSet method.
    //   We keep the width and height for comparison only; if ImageSet is
called
    //   and these have changed, then we need to re-allocate mFlags, mCost.
    const unsigned char * mZeroCrossingAndGradientMagnitude;
    const unsigned char * mGradientDirection;
    //   Values used by the Compute methods to find minimum-cost paths back
to a seed pixel.
    bool                mSeedPixelSet;
    long                mSeedPixel;
    bool                mHasFailedpixel;
    long                mFailedpixel;                              //   the
one pixel which isn't expanded yet but which is allowed to be in the path.
    unsigned char       * mFlags;                                  //   see
the discussion in xpscissors_scissors.cpp for the meanings of the flags.
    union CostAngleByte
    {
        unsigned char       uCost;                                 //
    cost(mod 256) of getting to a pixel which is on the wavefront.
        signed char         uAngle;                                //
total rotation along path from seed pixel to this pixel, for pixels behind the
wavefront.
    }                   * mCostAngle;
    unsigned long       mEqualityCounter;
    //   The wavefront itself.
    XPRect              mExpandedRect;                             //
bounding box of expanded pixels
    unsigned char       mWavefrontMinimumCost;
    XPLazyQueue< long > mWavefront [ kCostCount ];
    //   ProcessPixel expects that all lazy-initialize tables have been
initialized,
    //   and it can just do its work. The parameter p is the index of some
pixel on
    //   the wavefront. pDirection is the direction from p to its parent
pixel, if
    //   it has one, or kDirectionCount for the seed pixel.
    void PushQ( long q, unsigned char pqCost );
    void FirstVisit( long q, unsigned char pqCost, unsigned char qFlags,
unsigned char qDirection );
    void RepeatedVisitOverride( long q, unsignedchar pqCost, unsigned char
qFlags, unsigned char qDirection );
    void RepeatedVisitEqual( long p, long q, unsigned char pqCost, unsigned
char qFlags, unsigned char pDirection, unsigned char qDirection );
    void ProcessPixel( long p, unsigned char pDirection, const unsigned char
* qDirection );
    //   UpdateWavefrontMinimumCost finds the next non-empty queue on the
wavefront
    void UpdateWavefrontMinimumCost( );
    //   Compute is the engine behind ComputeQuanntum, ComputeAll, and
ComputeToTargetPixel.
    //   If maximumIterations is zero or negative, then there is no
maximum; if targetX and targetY
    //   describe a point outside of the image rectangle (eg if either is
negative), then there
    //   is no target pixel. It uses ProcessPixel to do its work.
    bool Compute( long maximumIterations, bool toTargetPixel = false,
XPPoint target = XPPoint( 0, 0 ));
    //   ResetSeedPixel clears out the flags used by Processpixel and
resets the wavefront.
    //   It can fail if it cannot set the seed pixel.
```

APPENDIX A-continued

```
    bool ResetSeedPixel( );
//    UpdateTables is called by Compute to ensure that all of the lazy
tables are in a good state.
//    It uses the functions ComputeGradientMagnitudeValues,
ComputeMultipliers, and
//    ComputeDirectionOffsets to do its work.
    void UpdateTables( );
    void ComputeGradientMagnitudeValues( );
    void ComputeMultipliers( );
    void ComputeDirectionOffsets( );
//    Small utilities:
    XPPoint ClipPoint( const XPPoint & point ) const;
    long PointIndex( const XPPoint & point ) const;
    signed char DirectionDifference( unsigned char parentDirection, unsigned
char direction ) const;
};
inline XPPoint XPScissorsI::ClipPoint( const XPPoint & point ) const
{
    long x = point.mX;
    long y = point.mY;
    if( x < 0 )
        x = 0;
    else if( x >= mImage.Getwidth( ))
        x = mImage.Getwidth( ) - 1;
    if( y = 0 )
        y = 0;
    else if( y >= mImage.GetHeight( ))
        y = mImage.GetHeight( ) - 1;
    return XPPoint( x, y );
}
inline long XPScissorsI::PointIndex( const XPPoint & point ) const
{
    DBASSERT( point == ClipPoint( point ));
    return point.mX + point.mY * mImage.Getwidth( );
}
inline signed char XPScissorsI::DirectionDifference( unsigned char
parentDirection, unsigned char direction ) const
{
//    This assert doesn't neccessarily hold when the parent is
mSeedPixel, which doesn't really have a direction.
//    DBASSERT(( parentDirection + 4 & kDirectionMask ) != direction );
//    we want a number between -3 and 3. We know that parentDirection
and direction are not opposite,
//    so direction - parentDirection is in the range -7 to 7, but never
-4 or 4. We need to map
//    -7 to 1, -6 to 2, -5 to 3, and 5 to -3, 6 to -2, and 7 to -1.
Adding 12 gets us to the range
//    5 to 19 with "equal" at 12, then mod 8 gives us 0 to 7 with
"equal" at 4, and -4 gets us what
//    we want. So this is return ( direction - parentDirection + 12 )
% 8 - 4.
    return (( int ( direction ) - int ( parentDirection ) + kDirectionCount
+ kDirectionCount / 2 ) & kDirectionMask ) - kDirectionCount / 2;
}
inline bool XPScissorsI::ComputeQuantum( )
{
    return Compute( kQuantum );
}
inline bool XPScissorsI::ComputeAll( )
{
    return Compute( 0 );
}
inline bool XPScissorsI::ComputeToTargetPixel( XPPoint target )
{
    return Compute( 0, true, ClipPoint( target ));
}
#endif // XPSCISSORS_SCISSORS_H
```

What we claim is:

1. A method for tracing an object in an image, comprising the steps of:

selecting a first point on an edge of said object;

determining a first path from the first point to a second point in the image;

determining a cost of the first path;

determining a second path from the first point to the second point;

determining a cost of the second path;

selecting one of the first and second paths, including, when the costs of the first and second paths are equal, by determining a first total rotation amount of the first path, determining a second total rotation amount of the second path, and
selecting one of the first and second paths according to the first and second total rotation amounts.

2. The method according to claim 1, wherein:
the image comprises a plurality of pixels;
the first and second points are each one of the pixels;
the first path comprises three or more first-path pixels including the first and second points;
the second path comprises three or more second-path pixels including the first and second points;
the step of determining a first total rotation amount of the first path comprises the steps of determining a rotation amount between each adjacent pair of the first-path pixels and summing these rotation amounts; and
the step of determining a second total rotation amount of the second path comprises the steps of
determining a rotation amount between each adjacent pair of the second-path pixels and summing these rotation amounts.

3. The method according to claim 2, wherein the steps of determining a cost of the first path and determining a cost of the second path further each comprise the steps of:
determining a gradient magnitude G(p) of each pixel p in the path;
determining an edge direction E(p) for each pixel p in the path;
determining a direction D(p,q) between said pixel p and a neighboring pixel q in the path;
determining an edge orientation θ(p,q) between said pixel p and the neighboring pixel q;
determining a cost of an edge from said pixel p to said neighboring pixel q according to the below formula:

Halfcost $(p,q) = D(p,q)(\lambda_2+\lambda_3+\lambda_4-(1-\lambda_0)\cdot G(p)^{\lambda_1}\cdot \text{Multiplier}(p,q)$ Halfcost $(q,p) = D(q,p)(\lambda_2+\lambda_3+\lambda_4-(1-\lambda_0)\cdot G(q)^{\lambda_1}\cdot \text{Multiplier}(p,q)$ Cost$(p,q)$=Halfcost$(p,q)$+Halfcost$(q,p)$ where Multiplier(p,q)=$\lambda_3+\lambda_4 Z(p)+\lambda_2(\pi-2\chi(p,q)/\pi$, $\chi(p,q)$ is the lesser of $|\theta(p,q)-E(p,q)|$ or $\pi-|\theta(p,q)-E(p,q)|$, Z(p) is a Laplacian zero-crossing of pixel p{Multiplier (p,q)=$\lambda_3+\lambda_4 Z(p)+\lambda_2(\pi-2\chi(p,q))/\pi$}, and $\lambda_0$-$\lambda_4$ are scaling factors of a tension variable, a gradient response gamma, a gradient direction influence, a gradient magnitude influence and a zero crossing influence, respectively, which are used to modulate the gradient magnitude G(p) against the gradient direction D(p).

4. The method according to claim 2, wherein:
the rotation amount is measured in gradients of 45 degrees.

5. The method according to claim 1, wherein:
the step of selecting one of the first and second paths according to the first and second total rotation amounts includes selecting according to a maximum total rotation amount.

6. The method according to claim 1, wherein:
the step of selecting one of the first and second paths according to the first and second total rotation amounts includes selecting according to a minimum total rotation amount.

7. A method for editing a trace of an object in an image, the trace comprising one or more paths, each including a pair of boundary points on a boundary of the object, the method comprising the steps of:
selecting a path;
selecting a control point between the pair of boundary points on the selected path;
determining a first edited path from a first of the pair of boundary points of the selected path to the control point;
determining a cost of the first edited path;
determining a second edited path from the first of the pair of boundary points to the control point;
determining a cost of the second edited path;
selecting one of the first and second edited paths, including, when the costs of the first and second edited paths are equal, by
determining a first total rotation amount of the first edited path,
determining a second total rotation amount of the second edited path, and
selecting one of the first and second edited paths according to the first and second total rotation amounts.

8. The method according to claim 7, wherein:
of the one or more paths of the trace, only the selected path is modified.

9. A storage device in which is stored image data including object-trace data associated with an image, the object-trace data being generated by a method comprising the steps of:
selecting a first point on an edge of the object,
determining a first path from the first point to a second point in the image,
determining a cost of the first path,
determining a second path from the first point to the second point,
determining a cost of the second path,
selecting one of the first and second paths, including, when the costs of the first and second paths are equal, by
determining a first total rotation amount of the first path,
determining a second total rotation amount of the second path, and
selecting one of the first and second paths according to the first and second total rotation amounts.

10. The method of claim 7, wherein:
the image comprises a plurality of pixels;
the first edited path comprises three or more first-edited-path pixels of the plurality of pixels, including the control point and the first of the pair of boundary points of the selected path;
the second edited path comprises three or more second-edited-path pixels of the plurality of pixels, including the control point and the first of the pair of boundary points of the selected path;
the step of determining a first total rotation amount of the first edited path comprises the steps of
determining a rotation amount between each adjacent pair of the first-edited-path pixels and summing these rotation amounts; and
the step of determining a second total rotation amount of the second edited path comprises the steps of
determining a rotation amount between each adjacent pair of the second-edited-path pixels and summing these rotation amounts.

11. The method of claim 10, wherein the steps of determining a cost of the first edited path and determining a cost of the second edited path further each comprise the steps of:

determining a gradient magnitude G(p) of each pixel p in the path;

determining an edge direction E(p) for each pixel p in the path;

determining a direction D(p,q) between said pixel p and a neighboring pixel q in the path;

determining an edge orientation θ(p,q) between said pixel p and the neighboring pixel q;

determining a cost of an edge from said pixel p to said neighboring pixel q according to the below formula:

Halfcost$(p,q)=D(p,q)(\lambda_2+\lambda_3+\lambda_4-(1-\lambda_0)\cdot G(p)^{\lambda_1}\cdot$Multiplier$(p,q))$ Halfcost$(q,p)=D(q,p)(\lambda_2+\lambda_3+\lambda_4-(1-\lambda_0)\cdot G(q)^{\lambda_1}\cdot$Multiplier$(q,p))$ Cost$(p,q)=$Halfcost$(p,q)+$Halfcost$(q,p)$ where Multiplier $(p,q)=\lambda_3+\lambda_4 Z(P)+\lambda_2(\pi-2\chi(p,q))/\pi$, X(p, q) is the lesser of $|\theta(p,q)-E(p,q)|$ or $\pi-|\theta(p,q)-E(p,q)|$, Z(p) is a Laplacian zero-crossing of pixel p, and $\lambda_0-\lambda_4$ are scaling factors of a tension variable, a gradient response gamma, a gradient direction influence, a gradient magnitude influence and a zero crossing influence, respectively, which are used to modulate the gradient magnitude G(p) against the gradient direction D(p).

12. The method of claim 10, wherein:
the rotation amount is measured in gradients of 45 degrees.

13. A method for editing a trace of an object in an image, the trace comprising one or more paths, each including a pair of boundary points on a boundary of the object, the method comprising the steps of:
selecting a path;
moving a first of the pair of boundary points of the selected path to a new location point along the boundary of the object;
determining a first edited path from a second of the pair of boundary points of the selected path to the new location point;
determining a cost of the first edited path;
determining a second edited path from a second of the pair of boundary points of the selected path to the new location point;
determining a cost of the second edited path;
selecting one of the first and second edited paths, including, when the costs of the first and second edited paths are equal, by
determining a first total rotation amount of the first edited path,
determining a second total rotation amount of the second edited path, and
selecting one of the first and second edited paths according to the first and second total rotation amounts.

14. The method of claim 13, wherein:
of the one or more paths of the trace, only the selected path is modified.

15. The method of claim 13, wherein:
the image comprises a plurality of pixels;
the first edited path comprises three or more first-edited-path pixels of the plurality of pixels, including the new location point and the second of the pair of boundary points of the selected path;
the second edited path comprises three or more second-edited-path pixels of the plurality of pixels, including the new location point and the second of the pair of boundary points of the selected path;

the step of determining a first total rotation amount of the first edited path comprises the steps of
determining a rotation amount between each adjacent pair of the first-edited-path pixels and summing these rotation amounts; and
the step of determining a second total rotation amount of the second edited path comprises the steps of
determining a rotation amount between each adjacent pair of the second-edited-path pixels and summing these rotation amounts.

16. The method of claim 15, wherein the steps of determining a cost of the first edited path and determining a cost of the second edited path further each comprise the steps of:
determining a gradient magnitude G(p) of each pixel p in the path;
determining an edge direction E(p) for each pixel p in the path;
determining a direction D(p,q) between said pixel p and a neighboring pixel q in the path;
determining an edge orientation θ(p,q) between said pixel p and the neighboring pixel q;
determining a cost of an edge from said pixel p to said neighboring pixel q according to the below formula:

Halfcost$(p,q)=D(p,q)(\lambda_2+\lambda_3+\lambda_4-(1-\lambda_0)\cdot G(p)^{\lambda_1}\cdot$Multiplier$(p,q))$ Halfcost$(q,p)=D(q,p)(\lambda_2+\lambda_3+\lambda_4-(1-\lambda_0)\cdot G(q)^{\lambda_1}\cdot$Multiplier$(q,p))$ Cost$(p,q)=$Halfcost$(p,q)+$Halfcost$(q,p)$ where Multiplier$(p,q)=\lambda_3+\lambda_4 Z(P)+\lambda_2(\pi-2\chi(p,q))/\pi$, $\chi$(p, q) is the lesser of $|\theta(p,q)-E(p,q)|$ or $\pi-|\theta(p,q)-E(p,q)|$, Z(p) is a Laplacian zero-crossing of pixel p, and $\lambda_0-\lambda_4$ are scaling factors of a tension variable, a gradient response gamma, a gradient direction influence, a gradient magnitude influence and a zero crossing influence, respectively, which are used to modulate the gradient magnitude G(p) against the gradient direction D(p).

17. The method of claim 2, wherein the steps of determining a cost of the first path and determining a cost of the second path further each comprise the steps of:
determining a gradient magnitude G(p) of at least one pixel p in the path;
determining an edge orientation e(p,q) between the pixel p and a neighboring pixel q;
determining an edge direction E(p) for the pixel p;
determining an edge-orientation cost $\chi$(p,q) that is the lesser of $|\theta(p,q)-E(p,q)|$ or $\pi-|\theta(p,q)-E(p,q)|$; and
determining a cost of an edge from the pixel p to the neighboring pixel q including
modulating the edge-orientation cost $\chi$(p,q) by the gradient magnitude G(p).

18. The method of claim 2, wherein the steps of determining a cost of the first path and determining a cost of the second path further each comprise the steps of:
determining a gradient magnitude G(p) of at least one pixel p in the path;
determining a Laplacian zero-crossing of the pixel p; and
determining a cost of an edge from the pixel p to a neighboring pixel q including
modulating the Laplacian zero-crossing of the pixel p by the gradient magnitude G(p).

19. The method of claim 2, wherein the steps of determining a cost of the first path and determining a cost of the second path farther each comprise the step of:
  determining a cost of an edge from at least one pixel p in the path to a neighboring pixel q including
    determining a value equal to a gradient magnitude G(p) of the pixel p raised to an exponential power.

20. The method of claim 19, wherein:
  the step of determining a value comprises determining a value equal to the gradient magnitude G(p) of the pixel p raised to an exponential power represented by a scaling factor of a gradient response gamma $\lambda 1$.

21. A video system comprising:
  a storage device for storing image data including object-trace data associated with an object in an image; and
  an object tracer for extracting the object trace data from the image, constructed and adapted to
    select a first point on an edge of the object,
    determine a first path from the first point to a second point in the image,
    determine a cost of the first path,
    determine a second path from the first point to the second point,
    determine a cost of the second path,
    select one of the first and second paths, including to, when the costs of the first and second paths are equal,
    determine a first total rotation amount of the first path,
    determine a second total rotation amount of the second path, and
    select one of the first and second paths according to the first and second total rotation amounts.

22. The video system of claim 21, further comprising:
  a capture device for receiving the image data.

23. The video system of claim 21, further comprising:
  a trace editor for editing the object trace data, wherein the trace data comprises one or more paths, each including a pair of boundary points on a boundary of the object, the trace editor constructed and arranged to
    select a path,
    select a control point between the pair of boundary points on the selected path,
    determine a first edited path from a first of the pair of boundary points of the selected path to the control point,
    determine a cost of the first edited path,
    determine a second edited path from the first of the pair of boundary points to the control point,
    determine a cost of the second edited path,
    select one of the first and second edited paths, including to, when the costs of the first and second edited paths are equal,
    determine a first total rotation amount of the first edited path,
    determine a second total rotation amount of the second edited path, and
    select one of the first and second edited paths according to the first and second total rotation amounts.

24. The video system of claim 21, further comprising:
  a trace editor for editing the object trace data, wherein the trace data comprises one or more paths, each including a pair of boundary points on a boundary of the object, the trace editor constructed and arranged to
    select a path,
    move a first of the pair of boundary points of the selected path to a new location point along the boundary of the object;
    determine a first edited path from a second of the pair of boundary points of the selected path to the new location point;
    determine a cost of the first edited path;
    determine a second edited path from a second of the pair of boundary points of the selected path to the new location point;
    determine a cost of the second edited path;
    select one of the first and second edited paths, including to, when the costs of the first and second edited paths are equal,
    determine a first total rotation amount of the first edited path,
    determine a second total rotation amount of the second edited path, and
    select one of the first and second edited paths according to the first and second total rotation amounts.

25. A method for tracing an object in an image comprising a plurality of pixels, comprising the steps of:
  selecting a first point on an edge of said object;
  determining a first path from the first point to a second point in the image;
  determining a cost of the first path;
  determining a second path from the first point to the second point;
  determining a cost of the second path; and
  selecting one of the first and second paths according to their costs, wherein
    the steps of determining the cost of the first path and determining the cost of the second path each comprise the steps of
      determining a gradient magnitude G(p) of at least one pixel p in the path,
      determining an edge orientation $\theta(p,q)$ between the pixel p and a neighboring pixel q,
      determining an edge direction E(p) for the pixel p,
      determining an edge-orientation cost $\chi(p,q)$ that is the lesser of $|\theta(p,q)-E(p,q)|$ or $\pi-|\theta(p,q)-E(p,q)|$, and
      determining a cost of an edge from the pixel p to the neighboring pixel q including modulating the edge-orientation cost $\chi(p,q)$ by the gradient magnitude G(p).

26. A method for tracing an object in an image comprising a plurality of pixels, comprising the steps of:
  selecting a first point on an edge of said object;
  determining a first path from the first point to a second point in the image;
  determining a cost of the first path;
  determining a second path from the first point to the second point;
  determining a cost of the second path; and
  selecting one of the first and second paths according to their costs, wherein
    the steps of determining the cost of the first path and determining the cost of the second path each comprise the steps of
      determining a gradient magnitude G(p) of at least one pixel p in the path,
      determining a Laplacian zero-crossing of the pixel p, and
      determining a cost of an edge from the pixel p to a neighboring pixel q including modulating the Laplacian zero-crossing of the pixel p by the gradient magnitude G(p).

27. A method for tracing an object in an image comprising a plurality of pixels, comprising the steps of:
selecting a first point on an edge of said object;
determining a first path from the first point to a second point in the image;
determining a cost of the first path;
determining a second path from the first point to the second point;
determining a cost of the second path; and
selecting one of the first and second paths according to their costs, wherein
the steps of determining the cost of the first path and determining the cost of the second path each comprise the step of
determining a cost of an edge from at least one pixel p in the path to a neighboring pixel q including determining a value equal to a gradient magnitude G(p) of the pixel p raised to an exponential power.

28. The method of claim 27, wherein:
the step of determining a value comprises determining a value equal to the gradient magnitude G(p) of the pixel p raised to an exponential power represented by a scaling factor of a gradient response gamma $\lambda 1$.

29. The method of claim 7, wherein:
the step of selecting one of the first and second edited paths according to the first and second total rotation amounts includes selecting according to a maximum total rotation amount.

30. The method of claim 7, wherein:
the step of selecting one of the first and second edited paths according to the first and second total rotation amounts includes selecting according to a minimum total rotation amount.

31. The method of claim 15, wherein:
the rotation amount is measured in gradients of 45 degrees.

32. The method of claim 13, wherein:
the step of selecting one of the first and second edited paths according to the first and second total rotation amounts includes selecting according to a maximum total rotation amount.

33. The method of claim 13, wherein:
the step of selecting one of the first and second edited paths according to the first and second total rotation amounts includes selecting according to a minimum total rotation amount.

34. A computer program product for use with a computing system having a processor and a storage device for storing image data including object-trace data associated with an object in an image, the computer program product comprising a computer usable medium having embodied therein computer readable program code method steps for extracting the object trace data from the image, the method steps comprising:
selecting a first point on an edge of the object,
determining a first path from the first point to a second point in the image,
determining a cost of the first path,
determining a second path from the first point to the second point,
determining a cost of the second path,
selecting one of the first and second paths, including, when the costs of the first and second paths are equal,
determining a first total rotation amount of the first path,
determining a second total rotation amount of the second path, and
selecting one of the first and second paths according to the first and second total rotation amounts.

35. The computer program product of claim 34, wherein the method steps further comprise:
editing the object trace data, wherein the trace data comprises one or more paths, each including a pair of boundary points on a boundary of the object, including the steps of
selecting a path,
selecting a control point between the pair of boundary points on the selected path,
determining a first edited path from a first of the pair of boundary points of the selected path to the control point,
determining a cost of the first edited path,
determining a second edited path from the first of the pair of boundary points to the control point,
determining a cost of the second edited path,
selecting one of the first and second edited paths, including to, when the costs of the first and second edited paths are equal,
determining a first total rotation amount of the first edited path,
determining a second total rotation amount of the second edited path, and
selecting one of the first and second edited paths according to the first and second total rotation amounts.

36. The computer program product of claim 34, wherein the method steps further comprise:
editing the object trace data, wherein the trace data comprises one or more paths, each including a pair of boundary points on a boundary of the object, including the steps of
selecting a path,
moving a first of the pair of boundary points of the selected path to a new location point along the boundary of the object;
determining a first edited path from a second of the pair of boundary points of the selected path to the new location point;
determining a cost of the first edited path;
determining a second edited path from a second of the pair of boundary points of the selected path to the new location point;
determining a cost of the second edited path;
select one of the first and second edited paths, including to, when the costs of the first and second edited paths are equal,
determining a first total rotation amount of the first edited path,
determining a second total rotation amount of the second edited path, and
selecting one of the first and second edited paths according to the first and second total rotation amounts.

* * * * *